United States Patent [19]
Hirata

[11] Patent Number: 4,736,148
[45] Date of Patent: Apr. 5, 1988

[54] AC MOTOR CONTROL METHOD AND ITS CONTROL APPARATUS

[75] Inventor: Akio Hirata, Tokyo, Japan

[73] Assignee: Kabushiki Kaisha Toshiba, Kawasaki, Japan

[21] Appl. No.: 914,273

[22] Filed: Oct. 2, 1986

[30] Foreign Application Priority Data

Oct. 9, 1985 [JP] Japan .................. 60-223455
Oct. 9, 1985 [JP] Japan .................. 60-223456

[51] Int. Cl.$^4$ ............................................. H02P 3/18
[52] U.S. Cl. .................................... 318/812; 318/801; 318/778; 318/723; 318/803; 363/10; 363/37; 363/51
[58] Field of Search ............ 318/801, 778, 723, 722, 318/803, 807, 721; 363/37, 10, 51

[56] References Cited

U.S. PATENT DOCUMENTS

| | | | |
|---|---|---|---|
| 4,131,937 | 12/1978 | Pelly et al. | 363/96 |
| 4,288,732 | 9/1981 | Wilson et al. | 318/801 |
| 4,328,454 | 5/1982 | Okuyama | 310/803 |
| 4,427,933 | 1/1984 | Wagener et al. | 363/37 |

FOREIGN PATENT DOCUMENTS

0114275  8/1984  European Pat. Off.
0153751  9/1985  European Pat. Off.

OTHER PUBLICATIONS

Patent Abstracts of Japan, vol. 8, No. 155 (E-256) [1592], 19th Jul. 1984, & JP-A-59 56873 (Toshiba K.K.) 02-04-1984.
Patent Abstracts of Japan, vol. 8, No. 74 (E—236) [1511]; & JP-A-58 222 786 (Hitachi Seisakusho K.K.), 24-12-1983.

Primary Examiner—William M. Shoop, Jr.
Assistant Examiner—Brian Young
Attorney, Agent, or Firm—Oblon, Fisher, Spivak, McClelland & Maier

[57] ABSTRACT

A self-extinguishing element such as a gate turn-off thyristor (GTO) is used for each arm of the inverter. A capacitive load is connected to the output terminal of the inverter. In a region where the output frequency of the inverter is low, the self-extinguishing element is forcibly commutated. In a high-frequency region, where the output frequency of the inverter is higher than that in the low-frequency region, the capacitive load causes the self-extinguishing element to be load-commutated.

8 Claims, 5 Drawing Sheets

AC MOTOR CONTROL METHOD AND ITS CONTROL APPARATUS

BACKGROUND OF THE INVENTION

1. Field of the Invention

This invention relates to a control method for improving the operational efficiency of a speed-controlled AC motor which is parallel-connected, together with a capacitive load, to the output of a current-controlled inverter for converting DC power into AC power, and to a control apparatus using this control method.

2. Discussion of Background

Various prior arts, relevant to the above control method or control apparatus, are known. Typical examples of the prior art are described in a paper entitled "Characteristic of Induction Motor Driven by Sinusoidal Output Current GTO Inverter" in National Convention Records of the Institute of Electrical Engineers of Japan, 1984, No. 582, and another example is the circuit shown in FIG. 1.

In the approach of the above paper, the inverter circuit is made up of self-extinguishing type semiconductor elements, such as gate turn-off thyristors (GTOs). The output current of the inverter is PMW-controlled to have a sinusoidal waveform. In this approach, the inverter circuit is controlled by forced commutation over the entire range of its operating speed. For this reason, power loss is increased in a snubber circuit for absorbing the switching surge current of the semiconductor elements. The result is a reduction in the operating efficiency of the inverter circuit.

The circuit of FIG. 1 is based on natural commutation. This approach, however, still entails many problems which need to be solved.

In FIG. 1, reference numeral 11 denotes an input terminal for the AC power source; 12, a rectifier; 13, a DC reactor; 14, an inverter circuit; 15, an induction motor serving as an inductive load; 16, a capacitive load such as a capacitor; 14$_2$, a thyristor. In FIG. 1, the AC power supplied from input terminal 11 for the AC power source is converted into DC power by rectifier 12. The converted DC power is smoothed by DC reactor 13. Inverter circuit 14 converts the smoothed DC power back into AC power, and supplies it to induction motor 15 and capacitive load 16. The relation of the currents of induction motor 15 and capacitive load 16 is illustrated in FIG. 2. In this figure, load current IM of induction motor 15 contains active current component IP and delayed reactive current component IL with power factor angle $\theta$1. Current IC of capacitive load 16 is an advanced reactive current component. Therefore, if advanced reactive current component IC is larger than delayed reactive current component IL, inverter 14 supplies current II with advanced power factor angle $\theta$2, as is shown in FIG. 4. When inverter 14 is operating to supply advanced current II and power factor $\theta$2, at the commercial power supply frequency band (50 to 60 Hz), is in the range from 10° to 20°, even if thyristors are used for switching the elements in the arms of inverter circuit 14, these thyristors can be load-commutated or commutated in a natural manner.

If it is possible to operate induction motor 15 in a speed-controllable manner while thyristers 14$_2$ of inverter circuit 14 are load-commutated, the operating efficiency of the inverter circuit is remarkably improved as compared to that obtained when induction motor 15 operates at a variable speed during the forced commutation of inverter circuit 14. If the motor is operated in the above manner, the circuit arrangement of inverter 14 can be made simple, so that the circuit design of the inverter for high voltage operation becomes easy. Although a synchronous motor may be used as the motor serving as the load, an induction motor will be used in the following description.

The circuit system of FIG. 1 has the advantageous features as mentioned above, but still has problems, which will be described below.

In FIG. 2, the current IC of capacitive load 16 is given as:

current IC $\propto$ (Inverter output frequency)$^2$.

This relation has been employed for the reason that it is common practice that a ratio of the output frequency of the inverter to the output voltage is controlled to be at a fixed value, during the variable control of the speed of induction motor 15 by inverter circuit 14. With this relation, when the operating frequency of inverter 14 is decreased, the current IC of capacitive load 16 is remarkably reduced, but delayed reactive current component II of induction motor 15 is substantially constant, irrespective of the operating frequency. Therefore, if the output frequency of inverter circuit 14 changes widely, output current II of inverter circuit 14 cannot maintain prescribed advanced power factor angle $\theta$2, and the load commutation of inverter circuit 14 becomes impossible.

One of the best ways to solve this problem is to increase the capacitance of capacitive load 16. This approach, however, entails the problem that if the capacitance of load 16 is increased, the required output capacity of inverter circuit 14, at the maximum output frequency of the inverter, correspondingly increases. For example, in order to operate the inverter at a frequency of 100% to 50% of the output frequency, the output capacity (kVA) of inverter circuit 14 requires 300% to 400% of the input capacity (kVA) of induction motor 15, under a fixed torque load.

SUMMARY OF THE INVENTION

It is accordingly an object of this invention to provide a control method for an induction motor, which can improve the operating efficiency of an inverter and expand the operating range of the same, and which can obviate the need for an increase in the required output capacity (kVA).

According to this invention, a self-extinguishing element such as a gate turn-off thyristor (GTO) is inserted in each arm of the inverter. A capacitive load is connected to the output terminal of the inverter. In a region where the output frequency of the inverter is low, the self-extinguishing element is forced to be commutated. In a high-frequency region where the output frequency of the inverter is higher than in the low-frequency region, the capacitive load causes the self-extinguishing element to be load-commutated.

DETAILED DESCRIPTION OF THE PREFERRED EMBODIMENTS

Figure 3:
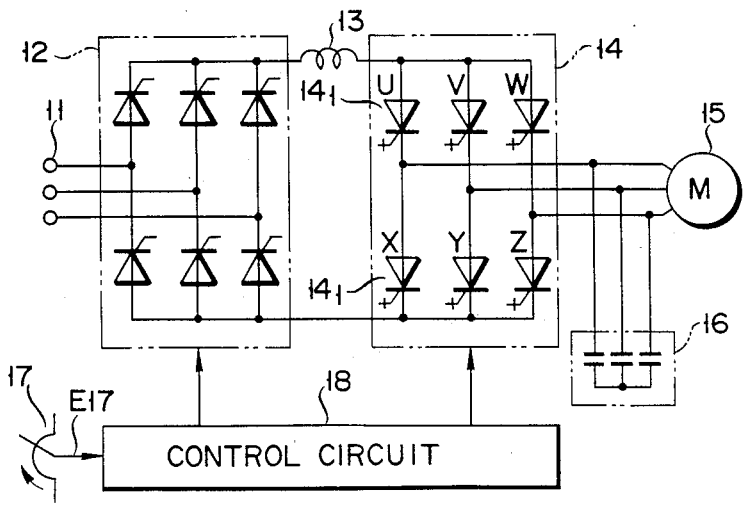
FIG. 3 is a circuit diagram of an inverter circuit according to an embodiment of this invention.

An embodiment of this invention is shown in FIG. 3. In this figure, the circuit components, designated by the same reference numerals as those in FIG. 1, have the same function as those components in FIG. 1. In FIG. 3, numeral 17 denotes a speed reference and 18 denotes a control circuit. Numerals $14_1$ are self-extinguishing type power converter elements (e.g., GTOs). A snubber circuit (not shown in the drawing) is connected in parallel with each of elements $14_1$. The AC power supplied from AC input terminal 11 is converted into DC power by rectifier 12. The converted DC power is smoothed by DC reactor 13. Then, the smoothed DC power is inverted by inverter 14, and the resulting AC power is supplied to capacitive load 16 and induction motor 15. The speed of revolution of induction motor 15 is controlled, via control circuit 18, to be based on the set value of speed reference 17. Details of control circuit 18 will be described later, with reference to FIG. 4.

When the set value of speed reference 17 is in the low-output frequency range (E181<Vref in FIG. 5), inverter 14, which converts the DC power to AC power, performs forced commutation against self-extinguishing type converter elements $14_1$, each constituting an arm of the bridge connection of inverter 14. In this low-speed range, delayed reactive current component IL of inductance motor 15 becomes greater than advanced reactive current component IC of capacitive load 16. Then, inverter 14 supplies output current II with a delayed current phase. At this time, a commutation surge voltage, caused by the forced commutation of self-extinguishing power converter elements $14_1$, is suppressed by capacitive load 16.

When the set value of speed reference 17 is in the intermediate-output frequency range, (E181≲Vref in FIG. 5), the phase angle of output current II of inverter 14 approaches zero (i.e., the output power factor approaches 1). When the output power factor approaches 1, self-extinguishing power converter elements $14_1$ are subjected to a forced commutation. Even though the forced commutation occurs, however, the value of the current that is cut off by this commutation is small, and the commutation surge voltage is sufficiently suppressed by capacitive load 16.

When the set value of speed reference 17 is in the high-output frequency range, (E181>Vref in FIG. 5), advanced reactive current IC is at a sufficiently high level, and self-extinguishing power converter elements $14_1$ can perform the load commutation under an advanced current phase. In order to perform this load commutation, control circuit 18 fetches a signal (E183 in FIG. 4) that is synchronized with the output voltage of inverter 14. Then, it outputs gate signals to start the load commutation. When output current II of inverter 14 is advanced in phase, since no commutation surge voltage appears, the capacity of the snubber circuits for absorbing the surge voltage of self-extinguishing power converter elements $14_1$ can be reduced.

Figure 1:
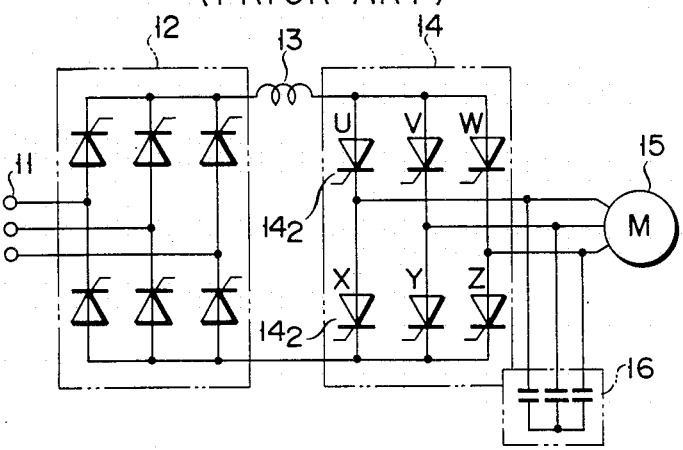
FIG. 1 is a circuit diagram of a prior inverter circuit.
Figure 2:
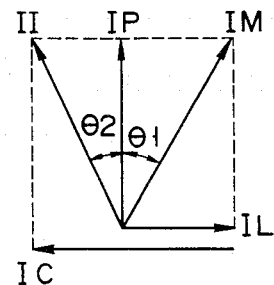
FIG. 2 shows a vector diagram illustrating phase relations of the currents of the circuit of FIG. 1.

In the embodiment of FIG. 1, which operates as described above, the capacity of capacitive load 16 can be smaller than that of conventional devices. As a result, the required output capacity of inverter 14 can be reduced. Also, the capacity of the snubber circuits of self-extinguishing power converter elements $14_1$ can be made smaller (made to have smaller loss), and the operating efficiency can be improved. By combining the load commutation and forced commutation of self-extinguishing power converter elements $14_1$, the operating range of induction motor 15 can be expanded, so that it can be operated over a wide frequency range.

Figure 4:
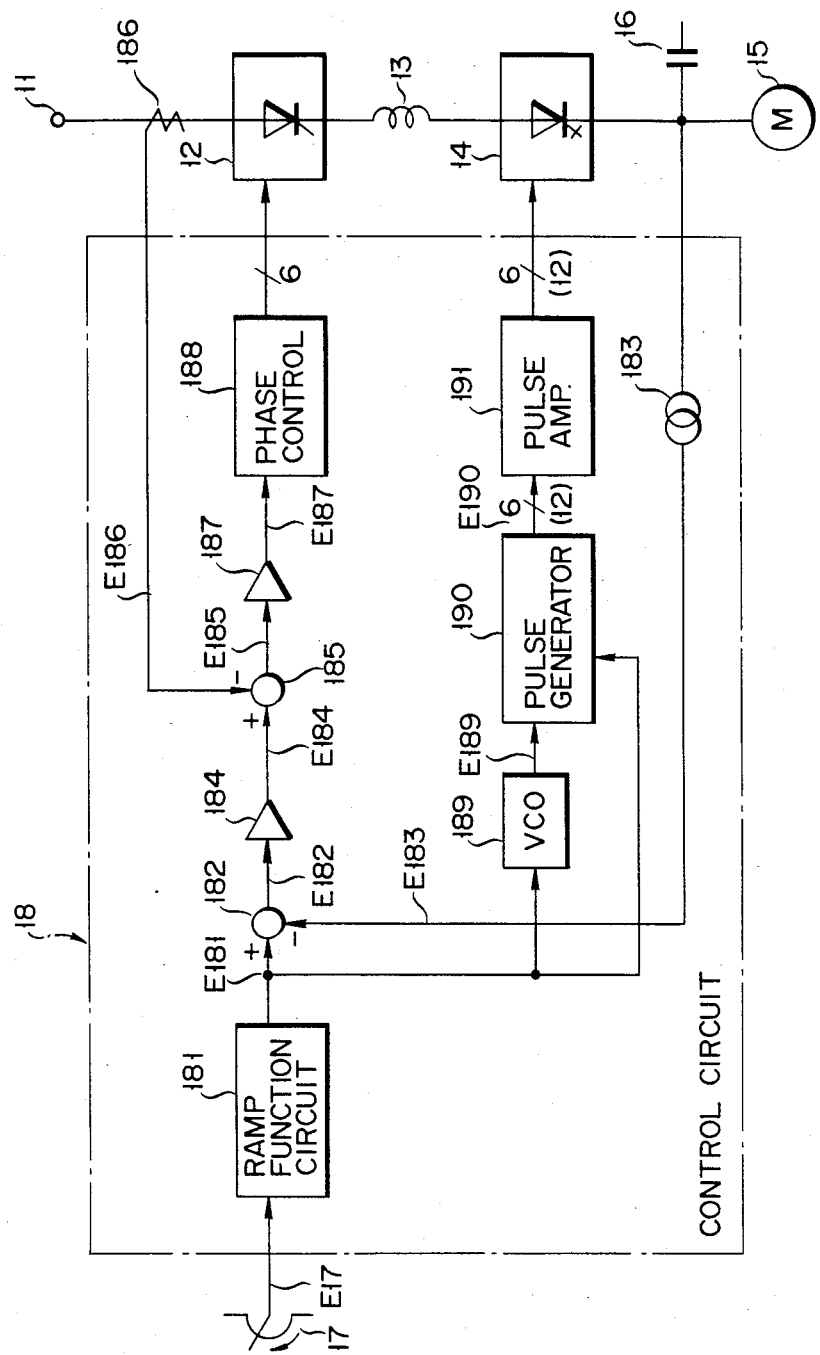
FIG. 4 shows a block diagram illustrating a control circuit (18) of FIG. 3.

Control circuit 18 of FIG. 1 can be constructed as shown in FIG. 4. The control circuit of FIG. 4 is designed to control the ratio (V/F) of the output voltage to the output frequency of inverter 14 to a constant value, based on the set value of speed reference 17. More specifically, speed reference 17 applies set value E17 to ramp function circuit 181. Circuit 181 generates an output frequency reference E181 having a fixed rate of level-change to be based on set value E17. Reference E181 is applied to the positive phase input of adder 182. Voltage signal E183, corresponding to the AC output voltage of inverter 14, is applied to the anti-phase input of adder 182, via potential transformer 183.

Adder 182 supplies difference E182, between reference E181 and signal E183, to voltage-control amplifier 184. Output E184 (output current reference) of amplifier 184 is applied to the positive phase input of adder 185. Current signal E186, corresponding to the DC input current of rectifier 12, is applied from current transformer 186 to the anti-phase input of adder 185. Adder 185 supplies difference E185, between output E184 and signal E186, to current control amplifier 187. Output E187 of amplifier 187 is applied to phase controller 188.

Controller 188 controls rectifier 12, such that the input current of rectifier 12 is rendered to be equal to output current reference E184. Controller 188 also controls rectifier 12, so that the output voltage of inverter 14 corresponds to output frequency reference E181.

Output frequency reference E181 is input to voltage-controlled oscillator (VCO) 189. VCO 189 generates pulse signal E189 having a frequency corresponding to the level of reference E181. Pulse signal E189 is input to pulse generator 190, details of which will be described later with reference to FIG. 5. According to pulse signal E189, circuit 190 generates twelve sets of 6-phase pulses E190, shown in FIGS. 6G to 6R (used for GTO $14_1$ and thyristor $14_2$ in FIG. 8); or it generates six sets of 6-phase pulses E190, shown in FIGS. 6G, 6I, 6K, 6M, 6O, and 6Q (used for GTO $14_1$ in FIG. 3). Pulses E190 are applied to inverter 14 via pulse amplifier 191.

Figure 5:
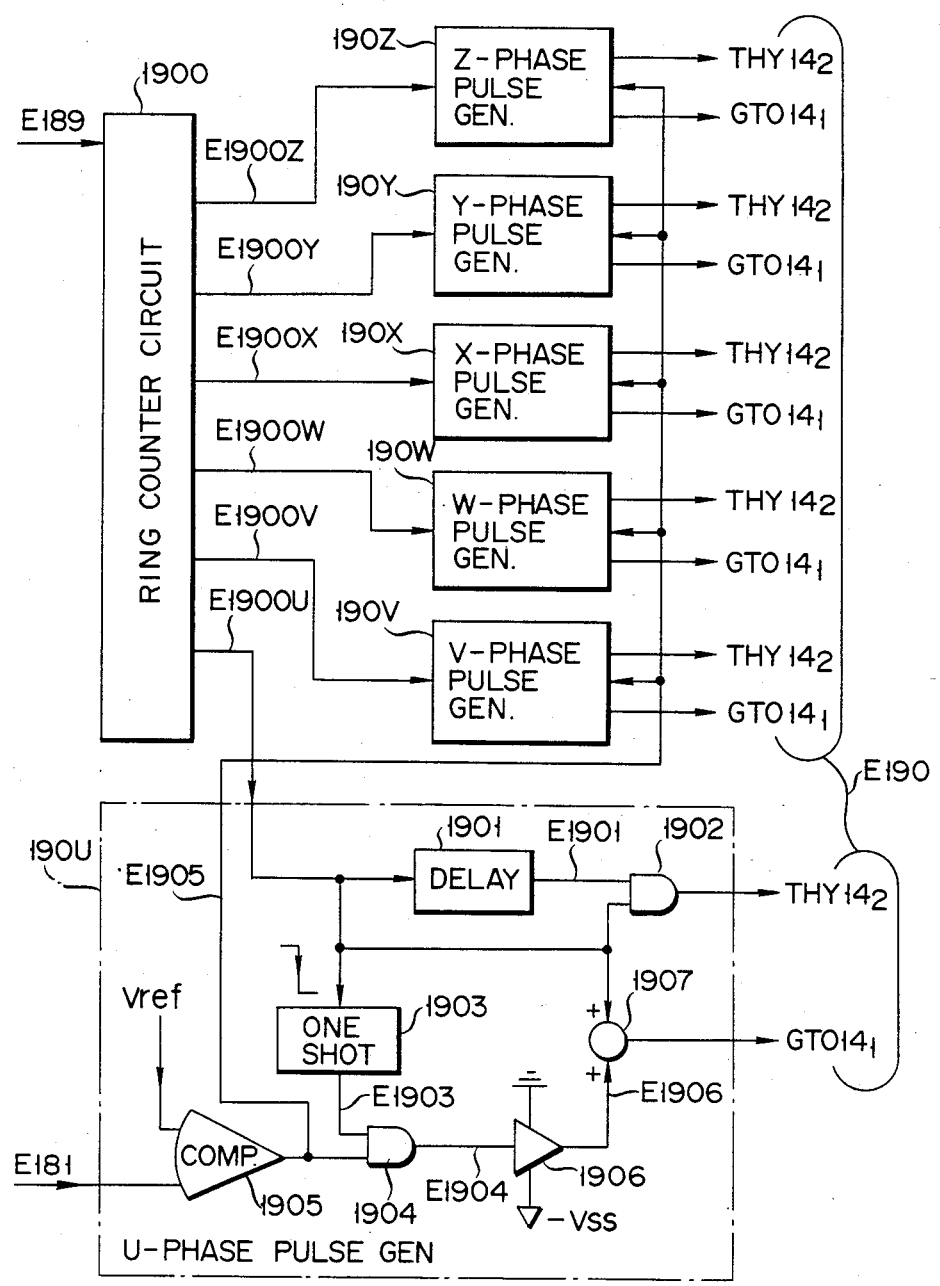
FIG. 5 shows a block diagram illustrating a circuit arrangement of a pulse generator (190) in FIG. 4.
Figure 6:
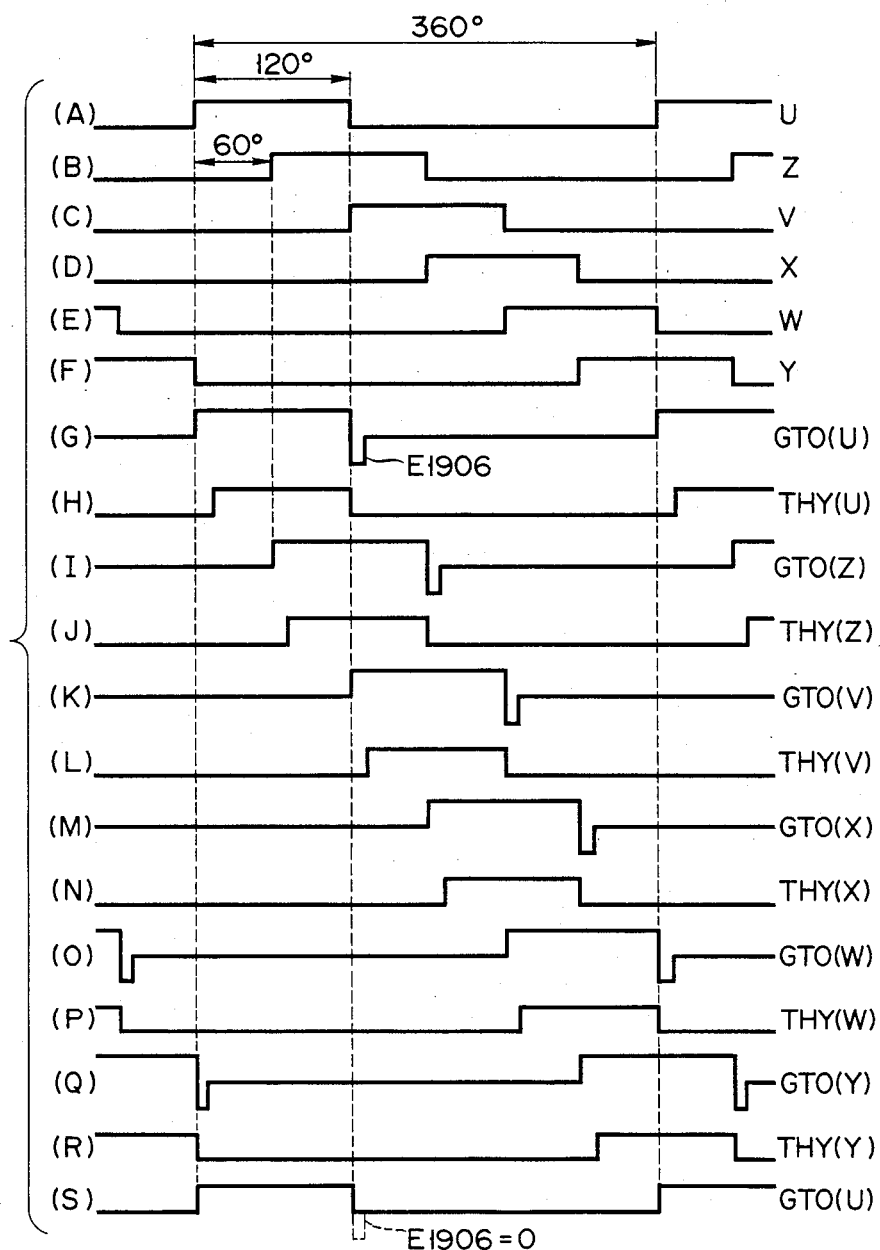
FIGS. 6A to 6S show timing charts useful in explaining the operation of the circuit of FIG. 4.

FIG. 5 shows an example of the internal configuration of pulse generator 190. Pulse signal E189 from VCO 189 is input, as a clock signal, to 6-bit ring counter circuit 1900. Counter circuit 1900 generates six pulses E1900U, E1900Z, E1900V, E1900X, E1900W, and E1900Y. The phase of each pulse is shifted by 60° from that of the preceding pulse (see FIGS. 6A to 6F). These six pulses are respectively input to pulse generators 190U to 190Z. The internal configuration of pulse generators 190U to 190Z is the same, so only the configuration of pulse generator 190U will be described in detail below.

Pulse E1900U from ring counter circuit 1900 is input to delay circuit 1901 in U-phase pulse generator 190U. Delay output E1901 from circuit 1901 and pulse E1900U are input to AND gate 1902. The output of AND gate 1902 (FIG. 6H) becomes the pulse which turns on U-phase thyristor $14_2$ of inverter 14.

One shot 1903 is triggered by the trailing edge of pulse E1900U. One shot 1903 then generates pulse E1903 having a fixed pulse width. Pulse E1903 is input to the first input of AND gate 1904. Output E1905 of comparator 1905 is applied to the second input of AND gate 1904. When output E1905 is at high level, AND gate 1904 passes pulse E1903, and AND output E1904 corresponding to E1903 is input to linear amplifier 1906.

Linear amplifier 1906 is activated by negative power supply $-Vss$. Amplifier 1906 outputs negative OFF pulse E1906 with the same pulse width as that of E1904 (=E1903). The amplitude of E1906 corresponds to that of E1904. Negative OFF pulse E1906 is superposed by adder 1907 onto the trailing edge of positive ON pulse E1900U. The resulting signal from adder 1907 is used for forcibly commutating U-phase GTO $14_1$ of inverter 14 (FIG. 6G).

Comparator 1905 compares, with predetermined reference level Vref, the signal level of output frequency reference E181 from ramp function circuit 181. Reference level Vref defines the boundary of frequency reference E181 at which inverter 14 switches from forced commutation to load commutation. This boundary frequency is chosen so that the power factor of the inverter output current will have a value of almost 1. In the low-, or intermediate-output frequency ranges of E181≦Vref, comparison output E1905 is at a high level. Then, negative OFF pulse E1906 is added to gate control pulse E190 for GTO $14_1$, so that forced commutation occurs. At the high-output frequency range of E181>Vref, the level of comparison output E1905 is low. Then, AND gate 1904 is closed and the level of OFF pulse E1906 drops to zero (FIG. 6S). In this case, the control signal (E190) of GTO $14_1$ is composed only of the positive ON pulse, and inverter 14, which is now operating with an advanced current phase, performs load commutation.

Incidentally, inverter 14 can be made to perform load commutation without reducing E1906 to zero, if the generation timing of E1906 is delayed for more than a certain time behind the trailing edge of E1900U.

Another embodiment of this invention will now be described, with reference to FIG. 8.

Figure 8:
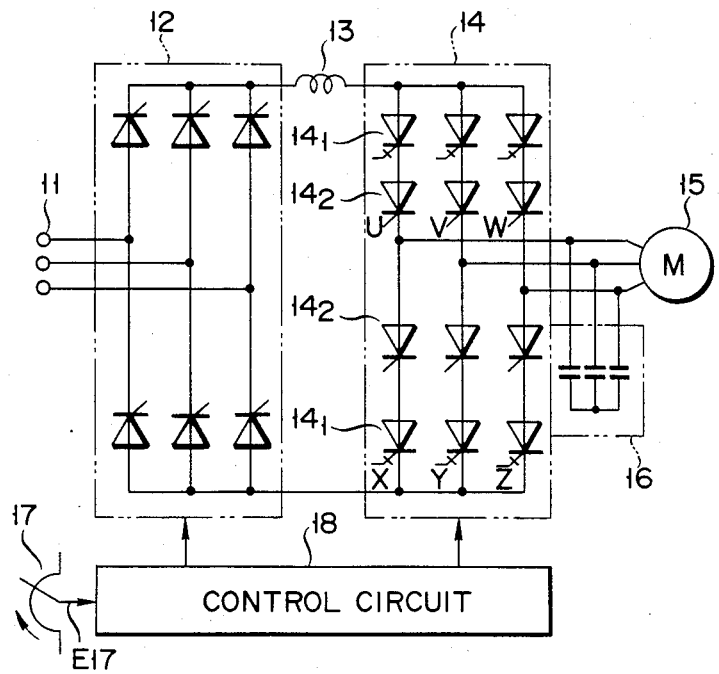
FIG. 8 shows a circuit diagram of an inverter circuit according to another embodiment of this invention.

The circuit components in FIG. 8, that are denoted by the same numerals as those in FIG. 3, have the same functions as the corresponding components of FIG. 3. As has been explained with reference to FIGS. 4 and 6, control circuit 18 can control inverter 14 by a forced commutation function or by a natural commutation function. Element $14_1$ is a self-extinguishing type (e.g., a GTO). Element $14_2$ is a natural-commutation type thyristor whose conduction-start timing is controllable.

In FIG. 8, just as in FIG. 3, AC power supplied from AC power supply input terminal 11 is converted to DC power, by rectifier 12. After being smoothed by DC reactor 13, the DC power is converted into AC power by inverter 14, and the converted AC power is supplied to capacitive load 16 and induction motor 15. The speed of revolution of induction motor 15 is controlled, via control circuit 18, by speed reference E17 obtained from speed reference-setting device 17. In this case, generally, the speed of revolution and input voltage of inductance motor 15 are controlled, so that the speed of revolution has a proportional relation with the input voltage.

When set value E17 of speed reference 17 is in the low-output frequency range (E181<Vref), inverter 14 is controlled with the forced commutation of self-extinguishing semiconductor element $14_1$. At this time, a commutation surge voltage is produced by the forced commutation of self-extinguishing semiconductor element $14_1$. During the initial stage of the forced commutation, most of the commutation surge voltage is applied to self-extinguishing semiconductor element $14_1$. Then, after the natural commutation is performed, a part of the surge voltage is applied to natural-commutation semiconductor element $14_2$. In this low-output frequency range, since the output voltage of inverter 14 is low, the commutation surge voltage is suppressed by capacitive load 16. Therefore, the voltage applied to self-extinguishing semiconductor element $14_1$ can be held within the rated voltage range of this element.

When set value E17 of speed reference 17 is in the intermediate-output frequency range (E181≲Vref), the power factor phase angle of output current II of inverter 14 becomes almost zero (i.e., the output power factor becomes about 1). At the output power factor of near 1, the forced commutation occurs in self-extinguishing semiconductor element $14_1$ of inverter 14. Thus, even if a commutation surge voltage is applied to self-extinguishing semiconductor element $14_1$ immediately after the forced commutation of element $14_1$, it can be suppressed to fall within the rated voltage range.

When set value E17 of speed reference 17 is in the high-output frequency range (E181>Vref), advanced reactive current component IC of capacitive load 16 is used by inverter 14. Because of this, the output power factor of output current II of inverter 14 crosses a boundary point near the power factor 1, and the phase of current II changes from a delayed-phase to an advanced-phase. This advanced-phase causes a natural commutation to be performed in natural-commutation semiconductor element $14_2$. Then, it causes a forced commutation to be performed in self-extinguishing semiconductor element $14_1$. By first performing a commutation in the natural-commutation mode in the above frequency range, the increase of commutation loss and the occurrence of a commutation surge voltage can be effectively suppressed. In this frequency range, forced commutation and natural commutation can be continuously performed for element $14_1$. Therefore, the reliability of the commutation can be increased without excessively increasing the power factor angle ($\theta 2$) of output current II of inverter 14. (This power factor angle can be increased by increasing the capacitance of capacitive load 16.)

Figure 9:
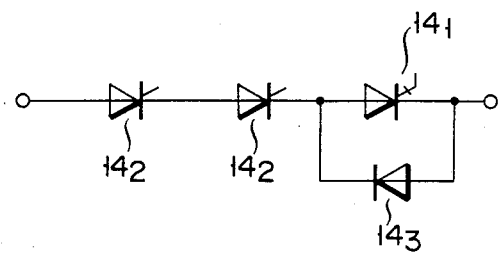
FIG. 9 shows a circuit diagram showing an arrangement of each arm in the inverter circuit of FIG. 8.

In this invention, the characteristics and type of the self-extinguishing semiconductor element $14_1$ are not limited to the particular ones described herein. For example, as is shown in FIG. 9, the circuit of one arm of inverter 14 can be made of two natural-commutation type semiconductor elements $14_2$ and one self-extinguishing semiconductor element $14_1$ connected in series to elements $14_2$. In this case, even when the reverse voltage rating of self-extinguishing semiconductor element $14_1$ is extremely small, if diode $14_3$, anti-parallel connected to element $14_1$, is provided, all the reverse voltage applied to this arm can be divided by two natural-commutation semiconductor elements $14_2$. Since the peak reverse voltage rating of self-extinguishing semiconductor element $14_1$ is generally small, it is usually necessary to connect a diode in series with element $14_1$, so as to increase the reverse voltage rating. However, if series-connected natural-commutation semiconductor elements $14_2$ are used as shown in FIG. 9, the above series diode (not shown) can be omitted.

Also, the turn-on loss of self-extinguishing semiconductor $14_1$ is generally large. As a means for reducing this turn-on loss, if the conduction start time of natural-commutation semiconductor element $14_2$ is delayed behind that of self-extinguishing semiconductor element $14_1$, the turn-on loss will be reduced. The delay of the conduction start time can be accomplished by controlling the application timing of gate signals (cf. the leading edges of pulses of FIGS. 6G and 6H).

In this invention, the self-extinguishing type power converter element is not limited only to a gate turn-off thyristor (GTO). It is evident that various kinds of elements, such as electrostatic induction thyristors, can be adapted.

Figure 7A:
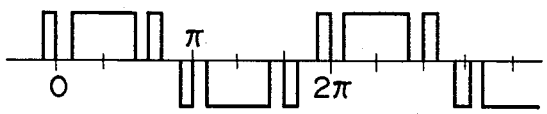
FIGS. 7A and 7B show modifications of the output waveform of the inverter circuit of FIG. 3.
Figure 7B:
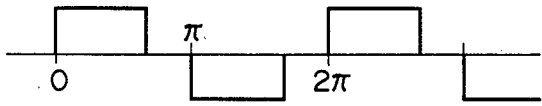

The output current waveform of inverter 14 is not limited in this invention. To improve the output waveform of inverter 14, in the low-output frequency range, pulse-width control (as shown in FIG. 7A) can be used, while in the intermediate-, or high-output frequency range, 120° square wave control (as shown in FIG. 7B) can be used.

Also, in the high-output frequency range, self-extinguishing power converter element $14_1$ can be controlled to be self-extinguished at about the time when the current-overlapping of a load commutation disappears. If controlled in this way, power factor angle $\theta_2$ of the inverter output current can be made smaller, and the required output capacity of inverter 14 can be reduced even further.

So long as the essence of this invention is not changed, various modifications can be made thereto.

In this invention, a capacitive load is connected to the output side of the inverter that drives the induction motor. The inverter is comprised of self-extinguishing power converter elements. In the intermediate-output frequency range of the inverter, the self-extinguishing power converter element is subjected to a forced commutation. In the high-output frequency range, a load commutation is performed. As a result, an induction motor control method and its device having the following features are obtained:

(1) The operating frequency range can be increased with use of small capacitive loads. Also, the required output capacity of an inverter can be reduced as compared to that of conventional ones.

(2) The capacitance of the capacitive load can be decreased. Especially, since the capacity of snubber circuits of the self-extinguishing power converter elements can be made smaller, a highly efficient system can be constructed.

(3) In addition to the above, because the required capacity of the inverter device can also be decreased, therefore, an economical, a compact system can be constructed.

(4) Furthermore, by properly adjusting the conduction-start timing of the self-extinguishing semiconductor element and the natural-commutation type semiconductor element, the turn-on loss of the self-extinguishing semiconductor element can be reduced. As a result, the efficiency of the device is increased.

What is claimed is:

1. A control method for variably controlling the speed of an AC motor serving as an inductive load, by use of a frequency converter which is formed of a rectifier, a DC reactor, and an inverter connected to a capacitive load, comprising the steps of:

forcibly commutating switching elements constituting said inverter, when the output frequency of said inverter is below a predetermined value; and
    load-commutating said switching elements when the inverter output frequency is above said predetermined value and current supplied to said inductive and capacitive loads becomes a phase-advanced reactive current.

2. The control method according to claim 1, wherein said predetermined value corresponds to the inverter output frequency, at which the power factor of an output current of said inverter is approximately 1.

3. The control apparatus for variably controlling the speed of an AC motor serving as an inductive load, by use of a frequency converter which is formed of a rectifier, a DC reactor, and an inverter connected to a capacitive load, comprising:

output-frequency detection means for detecting whether or not the output frequency of said inverter is higher than a predetermined value;
    forced-commutation means, coupled to said output-frequency detecting means, for forcibly commutating switching elements constituting said inverter when said output frequency is lower than said predetermined value; and
    load-commutation means, coupled to said output-frequency detection means, for load-commutating said switching elements when said output frequency is higher than the said predetermined value and a current supplied to said inductive and capacitive loads becomes a phase-advanced reactive current.

4. The control apparatus according to claim 3, wherein said predetermined value corresponds to the inverter output frequency at which the power factor of an output current of said inverter is approximately 1.

5. The control apparatus according to claim 3, wherein each of said switching elements includes a self-extinguishing element.

6. The control apparatus according to claim 5, wherein said switching elements further include natural-commutation switching elements respectively connected in series to said self-extinguishing switching elements.

7. The control apparatus according to claim 6, further comprising:

means, coupled to said forced-commutation means and load-commutation means, for turning on said natural-commutation switching element after the elapsing of a predetermined period of time from turning on of said self-extinguishing switching element.

8. The control apparatus according to claim 7, wherein said self-extinguishing switching element is a gate turn-off thyristor, and said natural-commutation switching element is a thyristor.

* * * * *